Nov. 10, 1953     M. J. D'AMORE     2,658,524
MANUAL OPERATOR FOR POWER-OPERATED VALVES

Filed Dec. 1, 1950     3 Sheets-Sheet 1

INVENTOR.
Michael J. D'Amore
BY
*Attys.*

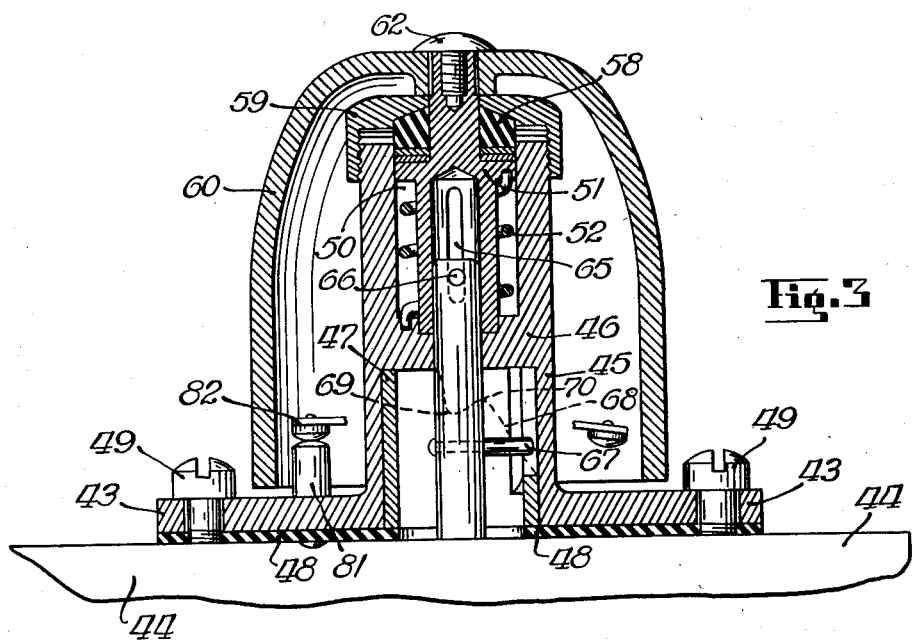
Fig. 3
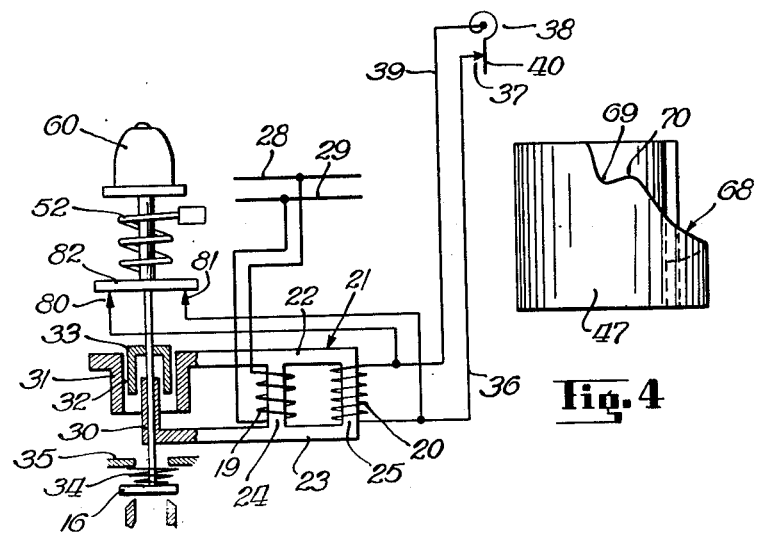
Fig. 4
Fig. 5
INVENTOR.
Michael J. D'Amore

Nov. 10, 1953  M. J. D'AMORE  2,658,524
MANUAL OPERATOR FOR POWER-OPERATED VALVES
Filed Dec. 1, 1950  3 Sheets-Sheet 3

INVENTOR.
Michael J. D'Amore
BY
*[signature]*
Attys.

Patented Nov. 10, 1953

2,658,524

UNITED STATES PATENT OFFICE 2,658,524

MANUAL OPERATOR FOR POWER-OPERATED VALVES

Michael J. D'Amore, Milwaukee, Wis., assignor to Milwaukee Gas Specialty Company, Milwaukee, Wis., a corporation of Wisconsin Application December 1, 1950, Serial No. 198,655

10 Claims. (Cl. 137—720)

This invention relates, in general, to valve operators, and has particular relation to an operator for manually operating power operated valves.

While the particular device which will be described hereinafter in connection with the drawings is a manual operator as applied to an electroresponsive or electrically operated valve, it is to be understood that the manual operator of the present invention is not limited to use with this particular type of valve but may be employed, for example, with fluid pressure operated valves or with other power operated valves as suitable or desired.

In power operated valves, such as electrically operated valves for controlling the flow of fluid, for example, the supply of gaseous fuel to a burner of a furnace for heating a dwelling or other space, it has been found that failure of the supply of power (for example, failure of the electric current supply for operating such valves) may result in failure of the valve to open or otherwise operate for an extended period of time. As a result there may be considerable human discomfort and other objectionable results attendant to such a power failure, particularly during severe weather conditions such as might prevail during the winter when storms may disrupt the supply of electric power in certain areas. At such time a condition of this character might even be dangerous.

By-pass devices and the like heretofore proposed have failed to meet entirely such conditions in an effective and convenient manner and may require a great amount of manual attention during the operation to prevent, for example, the additional dangerous condition of overheating after return of the power supply.

One of the main objects of the present invention is to overcome prior difficulties by providing in a power actuated control device—such, for example, as an electrically actuated valve—a controlling member having operative and inoperative positions, power actuated means for actuating the controlling member to operative position, means including a manual operator for manually actuating the controlling member to operative position and for retaining the controlling member in operative position upon power failure, and means operable by resumption of power to the power actuated means for returning the controlling member to control by the power actuated means.

Another object of the invention is to provide a device wherein the means for returning the controlling member to control by the power actuated means is rendered operative by power actuation of the controlling member to an operative position beyond the operative position to which such controlling member is actuated by the manual operator.

Another object of the invention is to provide a device in which manual actuation of the controlling member to operative position is accomplished by a simple turning movement of a manual operator.

Another object of the invention is to provide a device wherein there is cooperating cam means for imparting at least a component of rectilinear movement to the controlling member to actuate the same to operative position by turning movement of the manual operator, and in which the power actuated means imparts rectilinear movement to the controlling member to actuate the same to operative position.

Another object of the invention is to provide a device wherein there is spring means which is tensioned by turning of the manual operator to operative position and in which such spring means is released by resumption of power and acts to return the controlling member to control by the power actuated means.

Certain other objects and advantages of the present invention reside in the details of construction and in the arrangement and cooperation of the parts of the device in a manner to provide the new and advantageous results which will hereinafter appear.

In the drawings:

Figure 3 is a fragmentary axial sectional view through the manual operator similar to the upper sectioned part of Figure 1 but showing the manual operator on an enlarged scale and in inoperative position;

Figure 4 is a detail elevational view of the cam insert;

Figure 5 is a diagrammatic view showing one form of power actuated means for actuating the controlling member to operative position;

Figure 1:
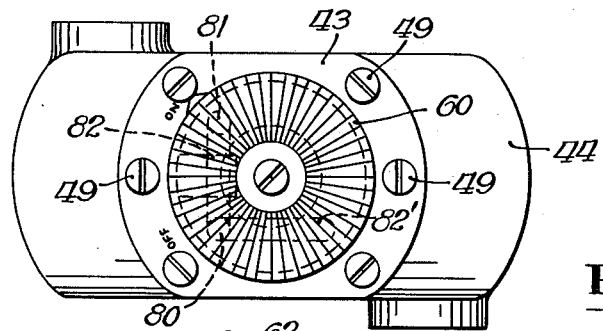
Figure 1 is a top plan view of one embodiment of the invention with the manual operator shown in operative position.
Figure 2:
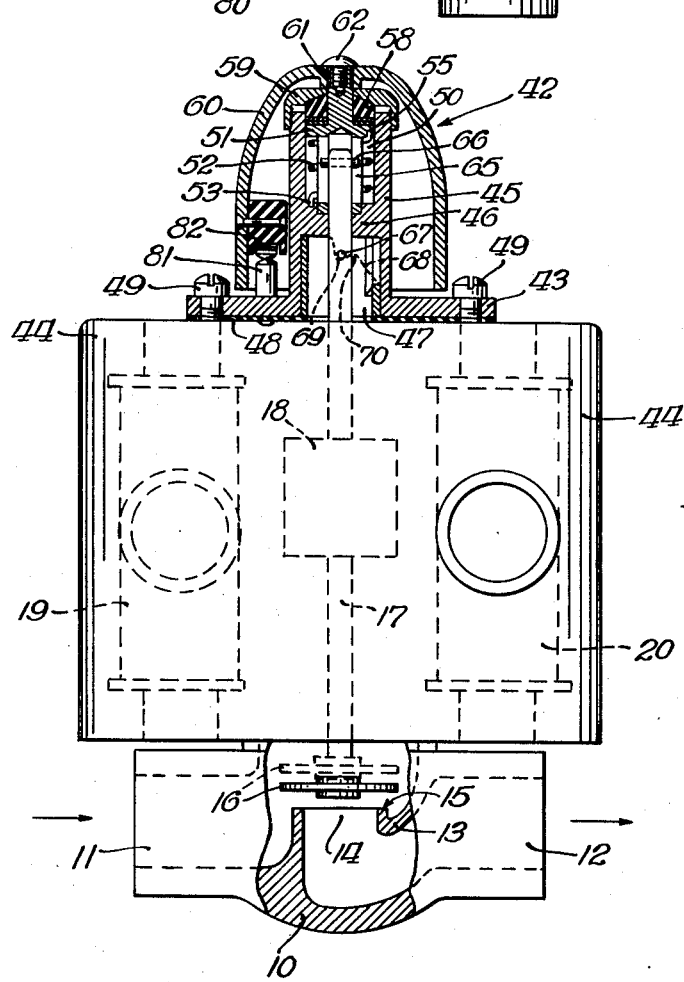
Figure 2 is a side elevational view of the device shown in Figure 1, with the manual operator shown in axial section and the valve body shown partially in section.

Referring now to the drawings, the embodiment of the invention selected for illustration in Figures 1-4 comprises a valve body 10 having a fluid inlet 11 and a fluid outlet 12.

Where the device is employed to control the flow of gaseous fuel to a burner (not shown)— such as the burner of a gas furnace or the like— the gaseous fuel enters the inlet 11 and is delivered from the outlet 12 to the burner in the direction of the arrows shown in Figure 2.

Within the valve body 10 between the inlet 11 and outlet 12 is a wall or partition 13 having a valve opening 14 surrounded at its inlet end by an annular valve seat 15. The valve member 16 which moves into closed or inoperative position against the valve seat 15, and into open or operative position separated from the valve seat 15 is carried on the lower end of a valve stem 17. Electrical operation of the valve member 16 to open position is accomplished by electrically actuated means designated diagrammatically in Figure 2 by the reference character 18 and as including a primary winding 19 and a second winding 20. The electrical operator may, for example, be of the type disclosed and claimed in the copending application of Gifford I. Holmes and Russell B. Matthews, Serial No. 180,482, filed August 19, 1950, or it may be of any other type; for example, a conventional solenoid type of electrical actuator may be employed.

In Figure 5 is shown diagrammatically an electric operator, in general, of the type disclosed more in detail in the above identified Holmes and Matthews application. This operator comprises a magnetic core 21 having parallel legs 22 and 23 magnetically connected by parallel legs 24 and 25. An alternating current primary winding 19 is wound around the leg 24, and the secondary winding 20 is wound around the leg 25. Electric power for energizing the winding 19 is supplied from a suitable source, for example, from line wires 28 and 29 of a suitable source of alternating current such as a household current supply line of the type which averages about 115 volts.

The magnetic core 21 has a magnetic post 30 which extends into a magnetic sleeve 31 with an annular air gap 32 therebetween. A non-magnetic and electric conducting sleeve 33 is free to travel in the air gap 32 and is operatively connected to the valve stem 17 to move the valve member 16 rectilinearly therewith. As shown diagrammatically in Figure 5, a spring 34 may be interposed between the valve member 16 and a fixed abutment 35 to move the valve member 16 to closed position.

One end of the secondary winding 20 is connected by a conductor 36 with a fixed contact 37 of a thermostat 38. A conductor 39 connects the other terminal 40 of the thermostat 38 to the other end of the secondary winding 20. The thermostat may be positioned in a room or other space, or it may be placed where it will be subject to the temperature of a heater, or otherwise disposed as desired. It is also contemplated that the device 38, instead of being a temperature responsive thermostat, may be any other condition responsive means or other device for opening and closing the circuit of the secondary coil 20, as suitable or desired. It is also contemplated to omit the secondary winding 20 and the core portion therefor, and to dispose the thermostat or other control device in the circuit for the primary winding 19.

With the particular electric operator selected for illustration, the primary winding 19 is always energized. With the thermostat contacts 37, 40 separated, the circuit for the secondary winding 20 is open, and this winding is not energized. At this time the magnetic flux established by the energization of primary winding 19 passes through legs 22, 25, 23 and 24 of the core 21, and very little or no flux passes to the air gap 32.

When, however, the thermostat closes the contact 40 into engagement with the contact 37, the circuit for the secondary winding 20 is closed and current is induced in the secondary winding by the energization of the primary winding 19. This current induces a magnetic flux which opposes the magnetic flux established in the leg 25 by the primary winding. As a result, the flux established by the winding 19 is diverted through the air gap 32.

Since the sleeve 33 is, in effect, a closed loop of good conductivity, there is induced in the sleeve 33 an alternating current of opposite polarity to that impressed upon the winding 19. This alternating current so induced in turn induces an alternating flux field about the sleeve 33. The polarity of at least a portion of the field thus induced opposes the magnetic flux established by the energization of the winding 19. As a result, the sleeve 33 is repulsed or repelled upwardly as shown in Figure 5 out of the air gap 32. The valve stem 17 moves with the sleeve 33 and thus actuates the valve member 16 electrically to the open position shown in dotted lines in Figure 2. In the event of failure of electric power, or when the thermostat contacts open, the valve member 16 is actuated to closed position, for example, by the spring 34.

It is desirable in the event of failure of electric power to operate the valve member 16 to its open and closed positions. For this purpose there is provided a manual operator indicated by reference number 42. The manual operator comprises a plate 43 which may be bolted to the top of the casing 44 which encloses the electric operator. The plate 43 has a central upstanding cylinder 45 provided with an integral transverse web 46. The bottom of the transverse web 46 bears downwardly upon a cylindrical cam 47 which is engaged at its lower end by a sealing gasket 48 which engages the top of the casing 44. The transverse web 46 is held in place by bolts 49 so as to compress the sealing gasket 48 and retain the cam 47 solidly in place in engagement with the under surface of the web 46.

The top of the cylinder 45 is hollowed out at 50 to receive an operating stem 51. The operating stem 51 is biased for rotation in a counterclockwise direction as viewed in Figure 1 by a spring 52 which is secured at its lower end at 53 into the web 46, and, at its upper end, into the operating stem 51 at 55. A sealing gasket 58 is retained in place by a packing nut 59 to prevent leakage of gas through the uppermost end of the upstanding cylinder 45. An operating handle or manual operator 60 is splined at 61 and secured to the operating stem 51 by a screw 62. The operating stem 51 has diametrically opposed vertical slots 65 which are of sufficient length to permit full rectilinear travel of the valve member 16.

The upper end of the valve stem 17 is provided with a transverse or diametrical pin 66 which cooperates with the slots 65 to cause rotation of the stem 17 with rotation of the handle 60. A second pin 67 is carried by and extends out radially from the valve stem 17, and cooperates with a cam surface 68 for raising the valve member 16 to the open position shown in full lines in Figure 2 by manually turning the handle 60 in a clockwise direction as the device is shown in Figure 1. When the valve member 16 is in its manually opened position, the pin 67 has travelled up the cam surface 68 and is engaged in a dwell 69.

The dwell 69 has a surface 70 of such shape that the tension which is exerted by the spring 52 and which tends to rotate the stem 17 is unable to cause the stem 17 to turn in a counterclockwise direction upon release of the handle 60. The valve member 16 is thus held in the open position to which it is manually actuated. If, however, the operator desires to rotate the stem 17 in a counterclockwise direction manually to close the valve, the surface 70 is of such configuration that the pin 67 will ride upwardly and out of the dwell 69, whereupon the stem 17 will drop with accompanying movement of the valve member 16 to closed position. The manual operator 60 is thus operable manually to either open or close the electrically operated valve member 16.

In order to render the device fully automatic and assure a return to automatic operation upon the return of electric power after a power failure, a pair of contacts 80 and 81 are bridged by a contact bridge 82 when the valve member 16 is in the open position into which it is actuated manually. The bridging contact 82 is operatively connected to be turned by the spring 52, and the contacts 80 and 81 may be in parallel with controls for the electric circuit, and either in the secondary circuit as shown or in the primary circuit if desired.

In its automatic or electric operation, the valve member 16 operates electrically to open position and returns to closed position as previously described. Upon electric power failure, the valve member 16 moves to closed position. If during such power failure it is desired manually to open the valve, this is accomplished by grasping and manually turning the handle 60. This moves the valve member 16 to the open position shown in full lines in Figure 2 and the bridging contact 82 into contact with the contacts 80 and 81.

Now, upon resumption of electric power and regardless of whether the thermostat contacts 37 and 40 are open or closed, the valve member 16 will be electrically actuated to the open position shown in dotted lines in Figure 2. This movement of the valve member 16 to open position beyond the open position (shown in full lines) to which it is manually actuated releases the pin 67 from the dwell 69, and the spring 52 biases the stem 17 in a counterclockwise direction as the device is shown in Figure 1. As a result, the valve stem 17 will move downwardly with accompanying downward movement of the valve member 16 as soon as the bridging contact 82 is turned by the spring 52 to the position shown at 82' in Figure 1. The contacts may be sloped for ease of operation.

The off position of the operating portions of the device is shown in large scale in Figure 3. It is to be noted that the pin 67 has been rotated substantially 90° from that viewed in Figures 1 and 2, and is out of engagement with the cam surface 68. In such position of the valve stem 17 the valve member 16 will be in closed position and in engagement with the valve seat 15. It is also to be noted that the bridge contact member 82 is rotated to such position that only the contact 80 is engaged, and hence the parallel circuit which includes the contacts 80 and 81 is disabled and the device is again under the control of the automatic control or power means.

Figure 6:
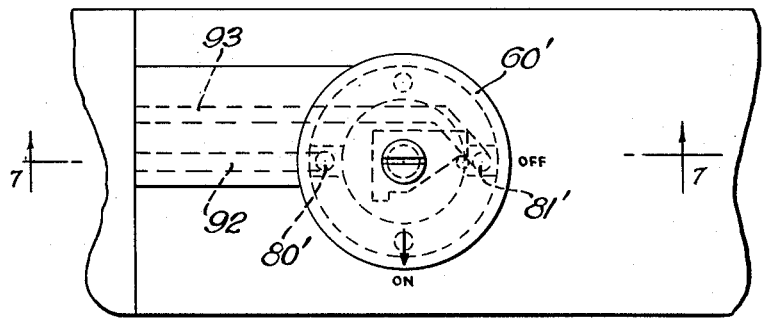
Figure 6 is a fragmentary elevational view similar to Figure 1 showing another form of manual operator embodying the present invention.
Figure 7:
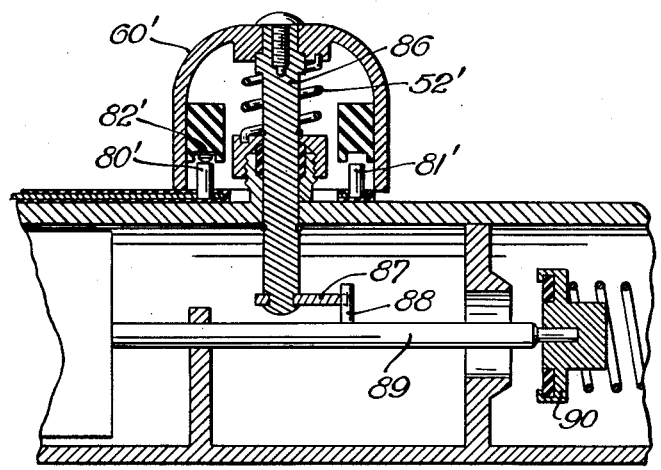
Figure 7 is a fragmentary sectional view taken on the line 7—7 of Figure 6.

In the embodiment of the invention shown in Figures 6 and 7, the handle 60' is connected to turn a stem 86 which carries a cam 87. This cam 87, by cooperation with a pin 88 on the valve stem 89, actuates the valve member 90 to open position. As before the pin 88 is released from the cam 87 by electrical actuation of the valve member 90 to open position beyond the open position to which it is actuated by the manual operator. The spring 52' corresponds in function with the spring 52 described in connection with the preceding embodiment of the invention, and the contacts 80' and 81' and bridging contact 82' correspond in function with the contacts 80 and 81 and bridging contact 82, as described in connection with Figures 1 and 5. The conductors for placing the contacts 80' and 81' in parallel circuit relation, as previously described, are indicated at 92 and 93.

The embodiments of the invention shown in the drawings are for illustrative purposes only, and it is to be expressly understood that said drawings and the accompanying specification are not to be construed as a definition of the limits or scope of the invention, reference being had to the appended claims for that purpose.

I claim:

1. In combination, a stem mounted for reciprocatory and turning movements, a controlling member connected to said stem for movement to first and second positions by the reciprocatory movement of said stem, a manual operator for turning said stem, cam means having at least a cooperating part on said stem for imparting an axial component of movement to said stem to move it from a first position to an intermediate position by turning movement imparted to said stem by said manual operator, electroresponsive means for energization by a source of electric power for moving said stem axially to a second position beyond its intermediate position, and an electric circuit having means for completing the same by manual actuation of said stem to its intermediate position to cause said electroresponsive means when effective to actuate said stem to its second position.

2. In combination, a stem mounted for reciprocatory and turning movements, a controlling member connected to said stem for movement to first and second positions by the reciprocatory movement of said stem, a manual operator for turning said stem, cam means having at least a cooperating part on said stem for imparting an axial component of movement to said stem to move it from a first position to an intermediate position by turning movement imparted to said stem by said manual operator, holding means rendered effective to hold said stem in its intermediate position by movement of said stem to said intermediate position, electroresponsive means for energization by a source of electric power for moving said stem axially to a second position beyond its intermediate position, an electric circuit having means for completing the same by manual actuation of said stem to its intermediate position to cause said electroresponsive means when effective to actuate said stem to its second position, and means for freeing the stem from said holding means by movement of said stem to its second position.

3. In combination, a stem mounted for reciprocatory and turning movements, a controlling member connected to said stem for movement to first and second positions by the reciprocatory movement of said stem, a manual operator for turning said stem, cam means having at least a cooperating part on said stem for imparting an axial component of movement to said stem to move it from a first position to an intermediate position by turning movement imparted to said stem by said manual operator, electroresponsive means for energization by a source of electric power for moving said stem axially to a second position beyond its intermediate position, an electric circuit having means for completing the same by manual actuation of said stem to its intermediate position to cause said electroresponsive means when effective to actuate said stem to its second position, and a spring secured at one end of its effective length to said stem and relatively fixedly secured at the opposite end of its effective length, said spring being tensioned by the turning component of movement of the stem in manual actuation of said stem to its intermediate position and rendered effective to free the stem from said holding means by movement of said stem to its second position.

4. In combination, a stem mounted for reciprocatory and turning movements, a controlling member connected to said stem for movement to first and second positions by the reciprocatory movement of said stem, a manual operator for turning said stem, said manual operator being mounted for turning movement and having a part connected to turn the stem therewith and for axial movement relative to said stem, cam means having at least a cooperating part on said stem for imparting an axial component of movement to said stem to move it from a first position to an intermediate position by turning movement imparted to said stem by said manual operator, electroresponsive means for energization by a source of electric power for moving said stem axially to a second position beyond its intermediate position, and an electric circuit having means for completing the same by manual actuation of said stem to its intermediate position to cause said electroresponsive means when effective to actuate said stem to its second position.

5. In combination, a stem mounted for axial and turning movements, a controlling member connected to said stem for movement between first and second positions by axial movement of said stem, an operator having turning movement and coacting with the stem to impart turning movement to said stem by turning movement of said operator, means for imparting an axial component of movement to the stem by turning movement thereof, and an electric switch actuated from one position to another position by turning movement of said operator.

6. In combination, a stem mounted for axial and turning movements, a controlling member connected to said stem for movement between first and second positions by axial movement of said stem, an operator having turning movement and coacting with the stem to impart turning movement to said stem by turning movement of said operator, means for imparting an axial component of movement to the stem by turning movement thereof, an electric switch actuated from one position to another position by turning movement of said operator, and means for holding said stem in a position to which it is moved by the axial component of movement imparted to said stem by the turning movement thereof.

7. In combination, a stem mounted for axial and turning movements, a controlling member connected to said stem for movement between first and second positions by axial movement of said stem, an operator having turning movement and coacting with the stem to impart turning movement to said stem by turning movement of said operator, means for imparting an axial component of movement to the stem by turning movement thereof, an electric switch actuated from one position to another position by turning movement of said operator, means for holding said stem in a position to which it is moved by the axial component of movement imparted to said stem by the turning movement thereof, and means for imparting axial movement to said stem beyond the axial component of movement imparted by turning of the stem to release the stem from said holding means.

8. In combination, a stem mounted for axial and turning movements, a controlling member connected to said stem for movement between first and second positions by axial movement of said stem, an operator having turning movement and coacting with the stem to impart turning movement to said stem by turning movement of said operator, means for imparting an axial component of movement to the stem in one direction by turning movement thereof, an electric switch actuated from one position to another position by turning movement of said operator, means for holding said stem in a position to which it is moved by the axial component of movement imparted to said stem by the turning movement thereof, means for imparting axial movement to said stem beyond the axial component of movement imparted by turning of the stem to release the stem from said holding means, and a spring tensioned by the turning component of movement of the stem and effective upon release to turn said stem in the opposite direction to prevent re-engagement of said holding means upon axial movement of the stem in the opposite direction.

9. In combination, a supporting sleeve, a stem mounted for axial and turning movements in said sleeve, a cam sleeve disposed within said supporting sleeve and having a cam surface, a pin carried by said stem and cooperating with said cam surface to impart an axial component of movement to the stem in one direction by turning movement thereof, a manual operator mounted for turning movement and having a part connected to turn the stem therewith and for axial movement relative to said stem, holding means at one end of said cam surface for holding said stem in a position to which it is moved by the axial component of movement imparted to said stem by said cam surface, and a coiled spring secured at one end of its effective length to said manual operator and at the opposite end of its effective length to said supporting sleeve, said spring being tensioned by the turning movement imparted to said stem by said manual operator and effective upon release to turn said stem in the opposite direction to prevent re-engagement of said holding means upon axial movement of the stem in the opposite direction.

10. In combination, a supporting sleeve, a stem mounted for axial and turning movements in said sleeve, a cam sleeve disposed within said supporting sleeve and having a cam surface, a pin carried by said stem and cooperating with said cam surface to impart an axial component of movement to the stem in one direction by turning movement thereof, a manual operator mounted for turning movement and having a part connected to turn the stem therewith and for axial movement relative to said stem, holding means at one end of said cam surface for holding said stem in a position to which it is moved by the axial component of movement imparted to said stem by said cam surface, a coiled spring secured at one end of its effective length to said manual operator and at the opposite end of its effective length to said supporting sleeve, said spring being tensioned by the turning movement imparted to said stem by said manual operator and effective upon release to turn said stem in the opposite direction to prevent re-engagement of said holding means upon axial movement of the stem in the opposite direction, and an electric switch actuated from one position to another position by turning movement of said manual operator.

MICHAEL J. D'AMORE.

References Cited in the file of this patent

UNITED STATES PATENTS

| Number | Name | Date |
| --- | --- | --- |
| 1,905,884 | Beam | Apr. 25, 1933 |
| 2,052,947 | Shivers | Sept. 1, 1936 |
| 2,155,358 | Cyr | Apr. 18, 1939 |
| 2,269,016 | Gille | Jan. 6, 1942 |
| 2,483,322 | Miller | Sept. 27, 1949 |